Figure 1:
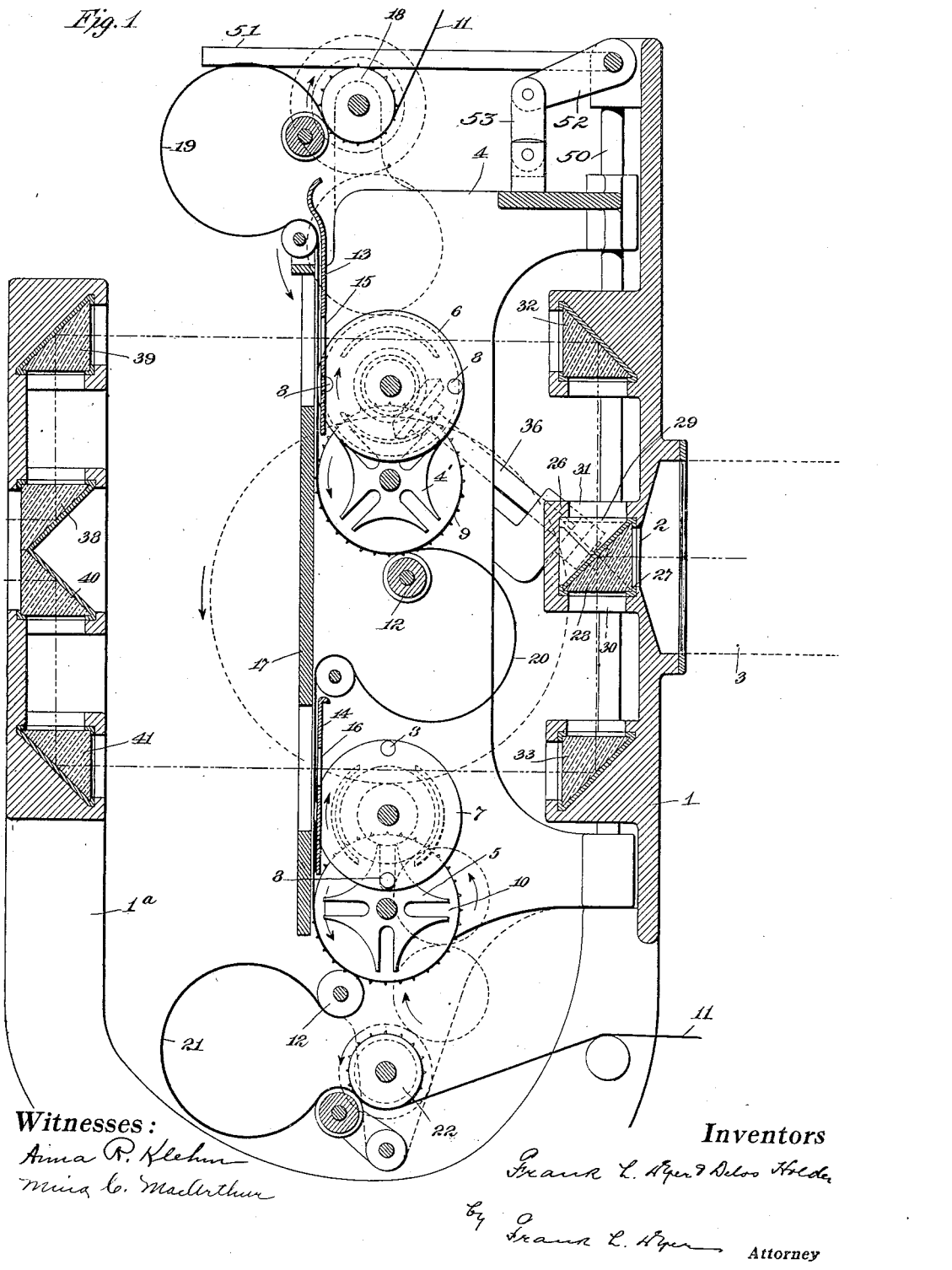

F. L. DYER & D. HOLDEN.
EXHIBITING APPARATUS FOR MOVING PICTURES.
APPLICATION FILED NOV. 6, 1905.

963,125.

Patented July 5, 1910.

3 SHEETS—SHEET 1.

Witnesses:

Inventors
Frank L. Dyer & Delos Holden
by Frank L. Dyer
Attorney

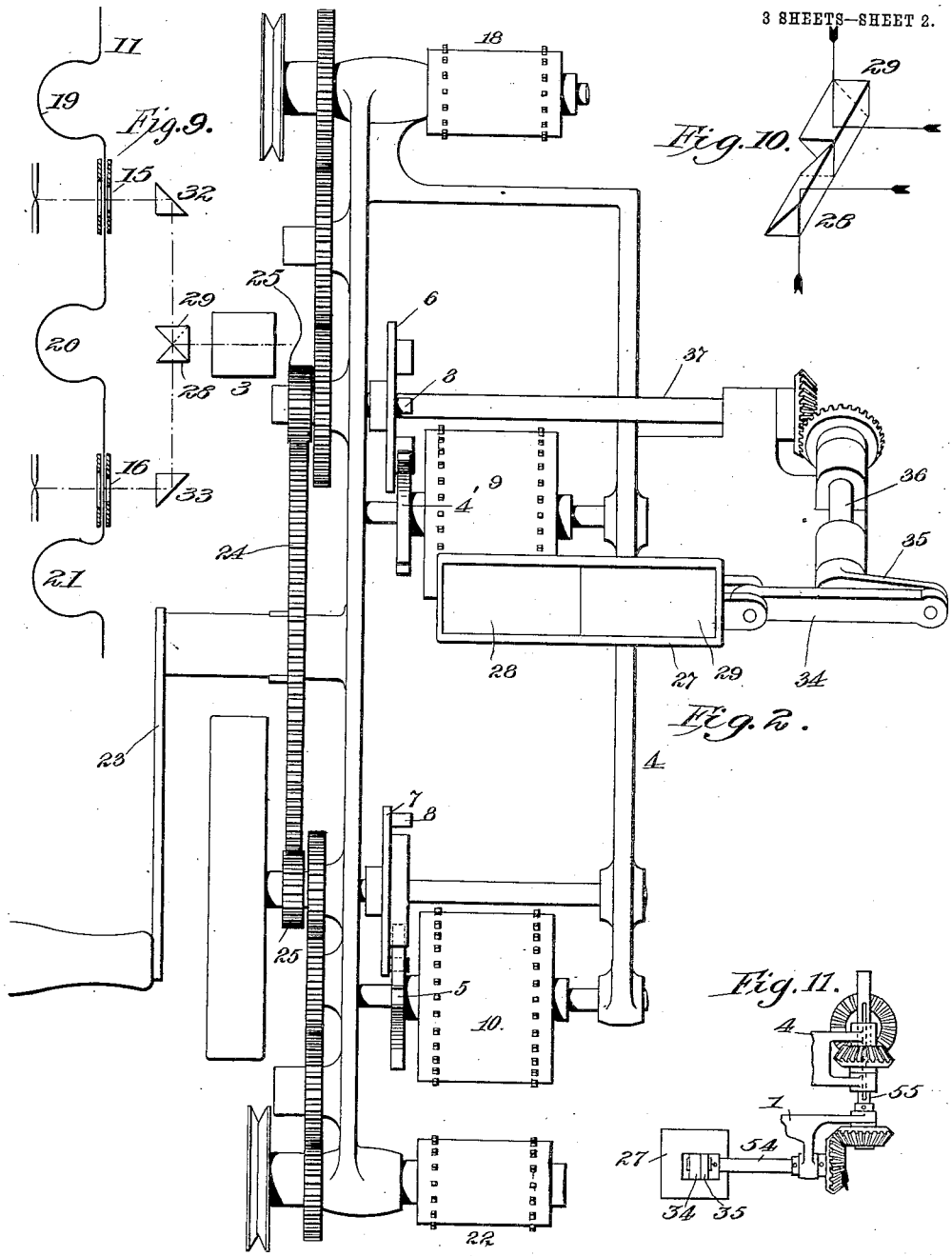

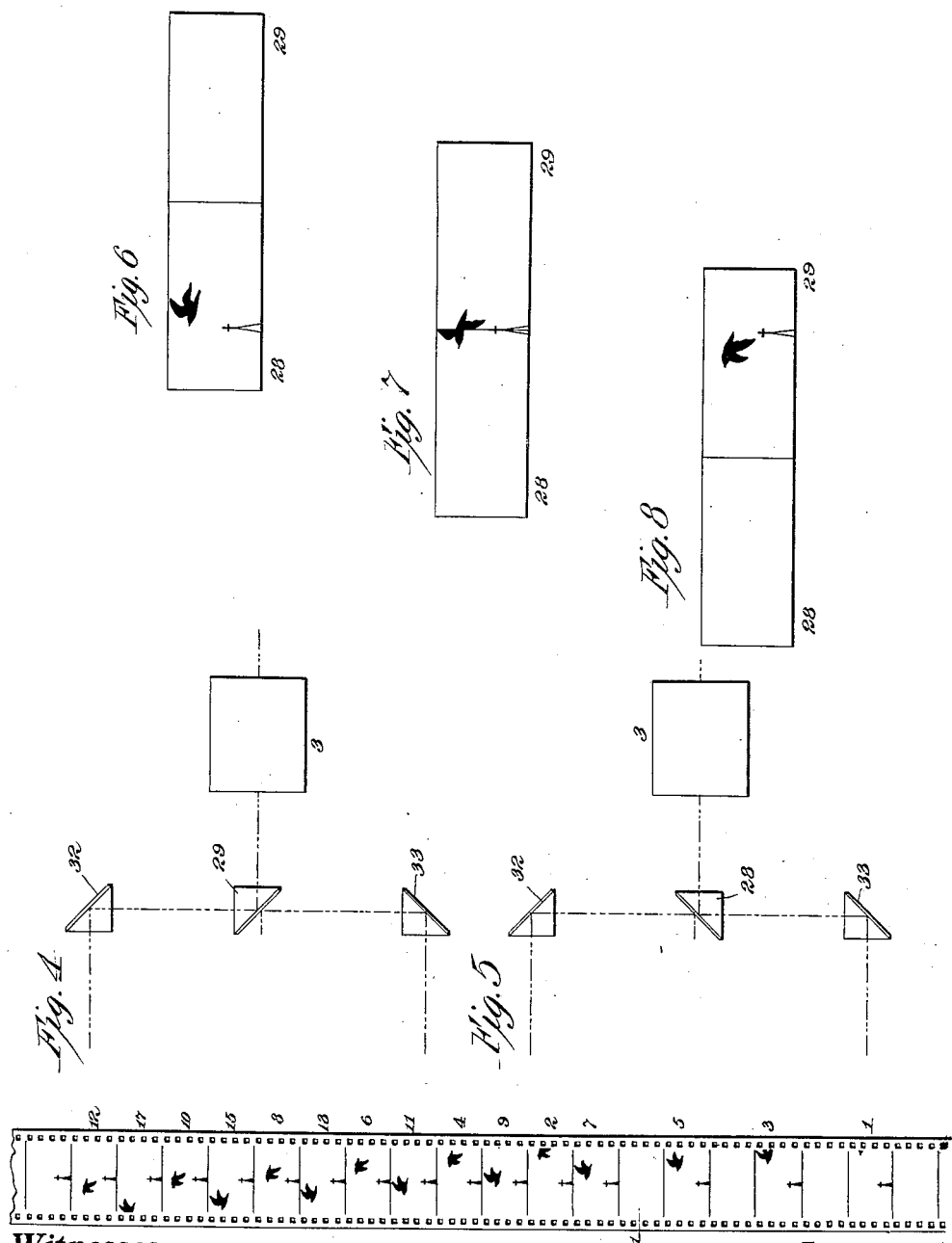

UNITED STATES PATENT OFFICE.

FRANK L. DYER, OF MONTCLAIR, AND DELOS HOLDEN, OF ORANGE, NEW JERSEY, ASSIGNORS TO EDISON MANUFACTURING COMPANY, OF WEST ORANGE, NEW JERSEY, A CORPORATION OF NEW JERSEY.

EXHIBITING APPARATUS FOR MOVING PICTURES.

963,125.   Specification of Letters Patent.   Patented July 5, 1910.

Application filed November 6, 1905. Serial No. 285,999.

*To all whom it may concern:*

Be it known that we, FRANK L. DYER, a citizen of the United States, and a resident of Montclair, in the county of Essex and State of New Jersey, and DELOS HOLDEN, a citizen of the United States, and a resident of Orange, in the county of Essex and State of New Jersey, have invented a certain new and useful Exhibiting Apparatus for Moving Pictures, of which the following is a description.

Our invention relates to an improved apparatus for exhibiting moving pictures of the type wherein the photographs are arranged in two arithmetical series, representing successive phases of movement, the members of the two series alternating and the photographs of one series being preceded by photographs of the other series which are representative of later phases of movement. By thus arranging the photographs it becomes possible to exhibit a photograph of one series, while the succeeding photograph of the other series is being moved into position to be exhibited, whereby a continuous effect is produced somewhat analogous to the exhibition of so-called "dissolving views."

Our object is to provide a simple and cheap apparatus by which moving pictures of this type may be effectively exhibited, and, wherein a single objective is used. Broadly stated, the invention comprises an apparatus having two exposure openings, across which both series of photographs are alternately moved in such a way that photographs of one series will be successively displayed at one exposure opening, while the photographs of the other series will be successively and alternately displayed at the other exposure opening, and having means for combining or progressively displaying the illuminated pictures of the two exposure openings through a single objective to thereby give the effect of motion, without, however, producing any flickering, since the amount of light entering the eye will be constant. Reflecting surfaces are so arranged that the images of the photographs successively and alternately brought to rest at the two exposure openings will be successively and alternately projected through the said objective upon a suitable screen. Said surfaces are preferably formed upon two reciprocating mirrors or prisms, arranged end to end, one adapted to reflect the light from one exposure opening and the other adapted to reflect the light from the other exposure opening, and so coördinated with the feed mechanism for the film that when a photograph is stationary at one opening, its mirror or prism will reflect an image therefrom to the objective, and when a photograph is stationary at the other exposure opening, its mirror in turn will reflect the image therefrom to the objective. Preferably, also, the feed mechanism will be so coördinated with the mechanism for reciprocating the two mirrors that an interval exists after a photograph at one exposure opening has been brought to rest before the picture being exhibited at the other exposure opening commences to be moved away, and during this period, the reciprocating mirrors will be moved so as to gradually cut off the image of one photograph and gradually disclose the image of the other photograph to thereby result in the projection on the screen of a composite image, as we will presently describe. In this way the total light projected on the screen will be constant at all times, so that there can be no flickering, while at the same time there will be always either a simple or composite image projected on the screen thereby making it possible to effect the exhibition of photographs at a very slow rate and do away with the necessity of securing the effect of persistence of vision, as is necessary with moving picture films as at present made.

The invention also preferably involves the use of reflecting surfaces or prisms by which a single source of light may be used, although as we will explain, two sources of light may be employed for illuminating the photographs at the two exposure openings.

In order that the invention may be better understood, attention is directed to the accompanying drawings, forming part of this specification and in which—

Figure 1, is a vertical sectional view through a projecting machine, embodying our invention in its preferred form, employing a single objective and a single source of light; Fig. 2, a front elevation of the film feeding and mirror operating mechanism;

Fig. 3, a detail view of a fragment of one of our improved moving picture films, showing a flying bird as the moving object, and a steeple as the stationary background; Fig. 4, a diagrammatic view, illustrating the movable mirror in position to reflect an image from the upper exposure opening to the objective; Fig. 5, a similar view, showing the position of the movable mirror to reflect an image from the lower exposure opening to the objective; Fig. 6, a front elevation of the two movable mirrors, showing one of them reflecting a simple image from one of the exposure openings; Fig. 7, a similar view showing the two mirrors moved to their mid-position and reflecting a composite picture from both exposure openings; Fig. 8, a similar view of the mirrors moved to the opposite point from Fig. 6, showing a reflection of a simple image from the exposure opening other than that of Fig. 6; Fig. 9, is a modification of the apparatus showing the use of a single objective, but with two sources of light; Fig. 10, an isometric view of the two reciprocating prisms; Fig. 11 is a side elevation of a modified form of drive mechanism for the reciprocating frame 27.

In all the above views, corresponding parts are represented by the same numerals of reference.

Referring first to Figs. 1 and 2, showing the preferred embodiment of our invention, a front plate 1 of a heavy rigid frame 1ª is formed with a central opening 2 in line with which is the usual projecting objective 3. Carried by the front plate 1 and vertically adjustable with respect to the same is a frame 4 in which the film feeding mechanism is mounted. The vertical adjustment is obtained in the structure shown by mounting the frame 4 on vertical guide rods 50 and providing a hand lever 51 which is journaled in the frame 1 and connected to the frame 4 by a crank 52 and link 53. The film feeding mechanism comprises means for intermittently feeding the film at two different points in alternation, the periods of movement in each case being preferably somewhat less than the periods of rest. Any suitable and appropriate mechanism may be used for this purpose, the one shown being a common form of pin-and-star-wheel movement, the two star wheels 4' and 5 being intermittently rotated by disks 6 and 7, having pins 8, 8 thereon. Mechanism of this type is well known, being employed in the Edison projecting kinetoscope, and other projecting machines now on the market. The star wheel 4' communicates its intermittent movement to a sprocket 9 on the same shaft, and the star-wheel 5 similarly drives a sprocket 10. The film 11 is provided with the usual perforated edges (see Fig. 3) and successively engages and is driven by the sprockets 9 and 10, being held in engagement therewith by the usual idlers 12, 12.

Above the feed sprockets 9 and 10 are plates 13 and 14, secured to the front plate 1 in any suitable way and formed with the usual windows 15 and 16 in which the pictures will be illuminated. Behind the plates 14 a single gate 17 is mounted on the frame 4 in any suitable way and arranged to be opened so as to permit the film to be readily threaded over the feeding sprockets, as will be understood. The film 11 is first engaged with a continuously operated sprocket 18, forming a loop 19 in the film before reaching the upper exposure opening 15. A second loop 20 is preferably formed in the film between the feed sprocket 9 and the lower exposure opening 16. Preferably a third loop 21 is formed in the film between the feed sprocket 10 and a continuously operated sprocket 22, from which the film passes to the take-up reel.

Any desired arrangement of gears may be employed for driving the several intermittent and continuously operating sprockets constituting the feed mechanism; preferably a crank 23 operates a gear 24 for engaging spur gears 25 on the shafts of the two pin disks 6 and 7 and from these latter shafts the sprockets 18 and 22 are driven by trains of gears, as shown. The front plate 1 is formed on its rear face with a guide 26 in which slides a frame 27, carrying two reflectors 28 and 29, preferably prisms. These are placed end to end, as clearly shown in Figs. 2 and 10, and so arranged that the prism 28 will reflect to the objective light rays coming from below through the opening 30 in the guide 26, while the prism 29 will reflect light rays coming from above through the opening 31. The direction of these reflections is shown in Figs. 1, 4, 5 and 10. Images of the photographs successively brought to rest in the exposure opening 15 are reflected downward through the opening 31 by the prism or other reflecting surface 32, securely mounted on the back of the front plate 1. A similar prism or reflecting surface 33 reflects images of the photographs alternately and successively brought to rest at the exposure opening 16 upwardly through the opening 30.

The prisms 28 and 29 are reciprocated by any suitable mechanism, so that when a picture is stationary in the exposure opening 15 and its image reflected downward by the prism 32, the prism 29 will be in position to reflect the image to the objective (see Fig. 8); then, when the succeeding picture has been brought to rest in the exposure opening 16 and before the picture in the exposure opening 15 is moved away, the movement of the prisms or mirrors will gradually cut off the image of the exposure opening 15 and gradually disclose the corresponding portions of the image of the exposure opening 16 as reflected by the prism 33, thereby forming a composite image, composed of complementary portions of two similar images as shown in Fig. 7. The continued movement of the prisms or reflecting surfaces will result in the reflection of a complete simple image from the exposure opening 16, by the prism 28, as shown in Fig. 6.

This reciprocating mechanism for the two prisms 28 and 29 is shown for the sake of simplicity in Figs. 1 and 2 as a connecting rod 34 operated by a crank 35 on a countershaft 36 driven by bevel gears from the shaft 37 of the disk 6 but in practice it will be understood that the driving mechanism used will be such as to permit the vertical adjustment of the frame 4 with respect to the plate 1—as for example by substituting for the shaft 36 a horizontal shaft 54 and vertical splined shaft 55 as shown in Fig. 11. The gearing is so proportioned and is so coördinated with the intermittent feed movement that an image from the exposure opening 15 will be reflected by the prism 29, while the feed sprocket 9 is at rest and an image at the exposure opening 16 will be reflected by the prism 28 while the feed sprocket 10 is at rest, the dividing line between the prisms moving across the field while both feed sprockets are at rest. Movement of the feed sprocket 9 takes place only when the prism 28 accommodates the entire field of the opening 16. On the other hand, the feed sprocket 10 does not move until the prism 29 accommodates the entire field of the opening 15.

The film used by us with our improved exhibiting apparatus is of the type before referred to, a fragment being shown in Fig. 3, wherein a flying bird is illustrated. It will be observed that the pictures are arranged in two arithmetical series, those representing pictures of even numbers (2, 4, 6, etc.) being shifted lengthwise of the film so as to be alternately disposed with respect to the pictures of the other series and be preceded by pictures representing later phases of movement. For instance, we show the second picture arranged between the 7th and 9th pictures, but obviously, the two series may be shifted to a greater or less extent, depending upon the distance between the exposure openings 15 and 16 and the extent of the loop 20, thereby permitting the exhibition of a photograph of one series at the exposure opening 15, and the following photograph of the other series at the exposure opening 16. To effect the proper feed movement the feed sprockets 9 and 10 may be twice the size of those ordinarily used, in order to feed the film two pictures at a time, or any other suitable mechanism to effect this result may be used. In this way, the pictures of one series will be exhibited at the exposure opening 15, and the pictures of the other series will be successively and alternately exhibited at the exposure opening 16. At all times, there will be projected either a simple picture or a composite picture, so that the element of persistence of vision does not have to be considered. Furthermore, since the light admitted to the objective is always uniform, no flickering can take place. The illumination can be furnished by any suitable source, for instance, an arc lamp. When a single lamp is used, the light may be reflected to the two exposure openings by mirrors or prisms 38, 39, 40 and 41, as shown in Fig. 1.

It will be understood of course, that instead of using a single source of light, two separate sources of light may be employed, as shown diagrammatically in Fig. 9.

It is of course obvious that in all forms of our invention lenses may be introduced at any point or points within the paths of the light, whenever desired to increase the luminosity of the images, or to change the sectional areas or degree of taper of the pencils or cones of light by which the images are formed, as is well understood by opticians.

Having now described our invention, what we claim as new and desire to secure by Letters Patent is as follows:—

1. In a moving picture exhibiting apparatus, the combination of a single source of light, means for directing the rays therefrom through a film at different points in its length, a single objective, and means for directing the rays which have passed through the film at the said points, through the said objective, substantially as set forth.

2. In a moving picture exhibiting apparatus, the combination of a single source of light, means for directing the rays from this source of light through fields in different portions in the length of a film, a single objective and means for directing the rays which have passed through the said fields through the said objective, the said last named means operating to cut off the light from one field as it admits light from the other field, substantially as set forth.

3. In a moving picture exhibiting apparatus, the combination of a single source of light, means for directing the rays from this source of light through fields in different portions of the length of a continuous film, a single objective, means for directing the rays which have passed through the said fields, through this objective, the said last named means operating simultaneously and progressively to cut off the light from one such field and permit the passage of the light from the other field through the said objective at the same rate and in the same direction whereby the visible portions of each field are at all times complementary to each other, substantially as set forth.

4. In a moving picture exhibiting apparatus, the combination of a single source of light, a single objective, a body having two display openings, means for passing a continuous film across said openings and regularly and intermittently bringing the same to rest at each opening, said means operating in such manner that the period of movement across one of the openings occurs during the period of rest at the other opening, means for directing the light from the single source through the said openings and means for directing the light which has passed through the said openings, through the said objective, substantially as set forth.

5. In a moving picture exhibiting apparatus, the combination of a single source of light, a single objective, a body having two display openings, means for passing a continuous film across said openings and regularly and intermittently bringing the same to rest at each opening, said means operating in such manner that the period of movement across one of the openings occurs during the period of rest at the other opening, means for directing the light from the single source through the said openings and means for directing the light which has passed through the said openings, through the said objective, said means operating to shut off the light from one such field as it admits it from the other, substantially as set forth.

6. In a moving picture exhibiting apparatus, the combination of a single source of light, a single objective, a body having two display openings, means for passing a continuous film across said openings and regularly and intermittently bringing the same to rest at each opening, said means operating in such manner that the period of movement across one of the openings occurs during the period of rest at the other opening, means for directing the light from the single source through the said openings and means for directing the light which has passed through the said openings, through the said objective, said means operating to expose complementary portions of said light openings at all times, substantially as set forth.

7. In a moving picture exhibiting apparatus, the combination with one or more frames or casings formed with a pair of display openings of means for passing a continuous strip across said openings, and regularly and intermittently bringing the same to rest at each opening, said means operating in such a manner that the period of movement at one opening occurs during the period of rest at the other opening, and a reciprocating member having a pair of abutting reflecting surfaces which bring the light emanating from fields of said openings alternately to a common point, substantially as set forth.

8. A moving picture exhibiting apparatus comprising an objective, a reciprocating member having a pair of differently inclined plane reflecting surfaces, and means for moving said member and thereby its reflecting surfaces across said objective, substantially as set forth.

9. A moving picture exhibiting apparatus comprising an objective, a reciprocating member having a pair of differently inclined reflecting surfaces back of said objective, and means for moving said member and thereby its reflecting surfaces across said objective, substantially as set forth.

10. A moving picture exhibiting apparatus comprising a single objective, a body having a pair of display openings, means for illuminating said openings, and a reciprocating member so arranged as to admit the light from said openings to said objective in alternation, substantially as set forth.

11. A moving picture exhibiting apparatus comprising an objective, a body having a pair of display openings, means for illuminating said openings, and a reciprocating member comprising a pair of prisms, each of which directs the light from one of said openings through said objective during a portion of its travel, substantially as set forth.

12. In a moving picture exhibiting apparatus, the combination of a body having a pair of display openings, means adjacent each opening for passing a picture strip across said opening and intermittently bringing the same to rest, said means being so coördinated that the period of movement at one opening occurs during the period of rest at the other opening, means for illuminating the fields of said openings, a single objective, a moving reflector which periodically intersects the path of the light issuing from one opening and deflects the same into the objective and another moving reflector which periodically intersects the path of the light issuing from the other opening and deflects the same into the objective, substantially as set forth.

13. In a moving picutre exhibiting apparatus, the combination of a body having a pair of display openings, means adjacent each opening for passing a picture strip across said opening and intermittently bringing the same to rest, said means being so coördinated that the period of movement at one opening occurs during the period of rest at the other opening, means for illuminating the fields of said openings, a single objective, and a reciprocating reflector which periodically deflects into the objective the light issuing from one opening and another reciprocating reflector which periodically deflects into the objective the light issuing from the other opening, substantially as set forth.

14. In a moving picture exhibiting apparatus, the combination of a body having a pair of display openings, means adjacent each opening for passing a picture strip across said opening and intermittently bringing the same to rest, said means being so coördinated that the period of movement at one opening occurs during the period of rest at the other opening, means for illuminating the fields of said openings, a single objective, and a pair of contiguous moving reflectors one of which is so placed as to periodically deflect into the objective the light issuing from one opening and the other to deflect into the objective the light issuing from the other opening, substantially as set forth.

15. In a moving picture exhibiting apparatus, the combination of a body having a pair of display openings, means adjacent each opening for passing a picture strip across said opening and intermittently bringing the same to rest, said means being so coördinated that the period of movement at one opening occurs during the period of rest at the other opening, means for illuminating the fields of said openings, a single objective, and a pair of contiguous moving prisms one of which is so placed as to periodically deflect into the objective the light issuing from one opening and the other to periodically deflect into the objective the light issuing from the other opening, substantially as set forth.

16. In a moving picture exhibiting apparatus, the combination of a body having a pair of display openings, means for illuminating the fields of said openings, a single objective, and reflectors which alternately direct the light from each field into the objective, the arrangement of display openings and reflectors being in geometrical symmetry with respect to a median plane, substantially as set forth.

This specification signed and witnessed this fourth day of November, 1905.

FRANK L. DYER.
DELOS HOLDEN.

Witnesses:
ANNA R. KLEHM,
MINA C. MACARTHUR.